United States Patent [19]

Brem et al.

[11] Patent Number: 5,165,262

[45] Date of Patent: Nov. 24, 1992

[54] SECURITY COVER ASSEMBLY

[75] Inventors: David J. Brem, West Burlington, Iowa; Robert T. Peterson, Gladstone, Ill.

[73] Assignee: Case Corporation, Racine, Wis.

[21] Appl. No.: 661,257

[22] Filed: Feb. 26, 1991

[51] Int. Cl.⁵ .............................................. B65D 55/14
[52] U.S. Cl. ........................................ 70/158; 70/57; 70/160; 70/167; 180/90
[58] Field of Search ............... 70/57, 58, 158–173; 74/612; 180/90

[56] References Cited

U.S. PATENT DOCUMENTS

| | | | |
|---|---|---|---|
| 3,302,743 | 2/1967 | Mosquera | 180/90 |
| 3,452,835 | 7/1969 | Deli et al. | 180/90 |
| 3,557,897 | 1/1971 | Conner | 180/90 |
| 3,583,519 | 6/1971 | Meyer . | |
| 3,780,822 | 12/1973 | Frey . | |
| 3,814,205 | 6/1974 | Miller . | |
| 3,841,431 | 10/1974 | Russey | 180/90 |
| 3,913,701 | 10/1975 | Williams . | |
| 4,112,718 | 9/1978 | Logsdon et al. | 70/159 |
| 4,131,173 | 12/1978 | Boersma . | |
| 4,299,361 | 11/1981 | Webb | 70/57 X |
| 4,335,909 | 6/1982 | Schmitz, Jr. . | |
| 4,549,625 | 10/1985 | Tindall . | |
| 4,888,968 | 12/1989 | Azvedo | 70/167 X |

Primary Examiner—Alexander Grosz
Assistant Examiner—Suzanne L. Dino
Attorney, Agent, or Firm—Dressler, Goldsmith, Shore, Sutker & Milnamow, Ltd.

[57] ABSTRACT

A security cover assembly for an instrument panel. The cover assembly is hinged to a console and consists of upper and lower hinged portions that can be folded and moved to a stored position where it will not obstruct the operators vision. When closed the cover is locked in position and designed so that it can not be readily pried open. When opened, the cover is secured to the back of the console and is retained against vibration.

2 Claims, 5 Drawing Sheets

SECURITY COVER ASSEMBLY

FIELD OF THE INVENTION

This invention relates to a cover for an instrument panel on a console located on earth working equipment where it is desired to lock-up access to the instrument panel and when the equipment is not in use to prevent unauthorized use of the equipment or damage to the instruments on the console.

BACKGROUND OF THE INVENTION

This invention relates to an instrument panel cover for industrial equipment such as a tractor or other earth working equipment that is normally left overnight on an unprotected job site. Such equipment is usually located in off-road remote situations. Equipment of this type attracts vandals and are a natural attraction for children. Vandalism, usually results in damage to the instrument panel at the operator's station, which precludes proper and safe operation of the machine. Access to the ignition switch could also result in an authorized movement. Such vandalism, makes it necessary to replace the instruments, resulting in substantial expenses and downtime of the equipment during the period that repairs are being made.

Instrument covers currently being used are difficult to move between open and stored positions and when open result in a visual obstruction to the operator. Others require separation from the panel and remote storage.

SUMMARY OF THE INVENTION

In accordance with the present invention, there is to provide a novel locking cover assembly which precludes access to the instrument panel. The cover can be readily folded in half and moved to where it will occupy relatively little space and present no visual obstruction to the operator. The cover can be readily retained in an open position by the same type of locking arrangement used to lock it in the closed position. When open it is located where it will not interfere with normal operation of the panel controls. In the open position it is designed to be vibration free. The design is also configured to preclude prying of the cover to the open position, thus making it difficult for anyone to obtain access to the instrument panel. The hinge construction and locking arrangement are also designed to prevent access to the instruments and dials, etc. that are located on the surface of the instrument panel. The design of the cover in the closed position is such that the operator is forced to remove the key before the cover can be closed.

DESCRIPTION OF THE PREFERRED EMBODIMENT

Figure 1:
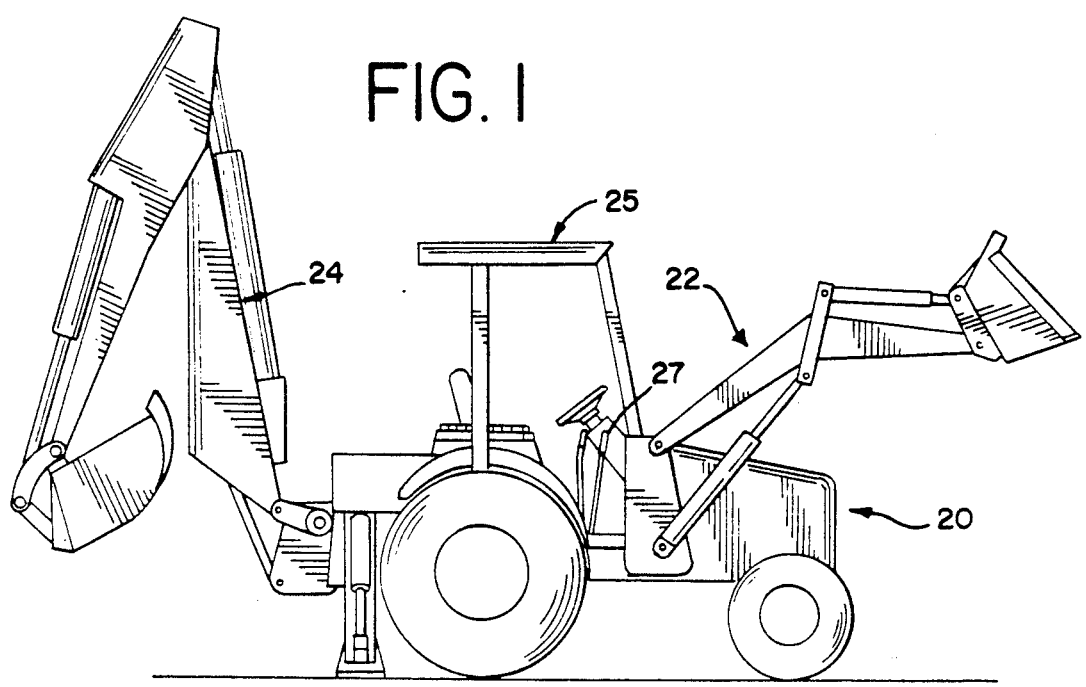
FIG. 1 is a side view of a tractor backhoe/loader earthworking machine employing a console cover over its instrument panel.

Referring first to FIG. 1, there is illustrated a tractor 20, to which is attached a front end loader 22 and a back hoe 24. Secured to the tractor is a cab 25 that surrounds the tractor operator and instrument panel located on the console 27.

Figure 2:
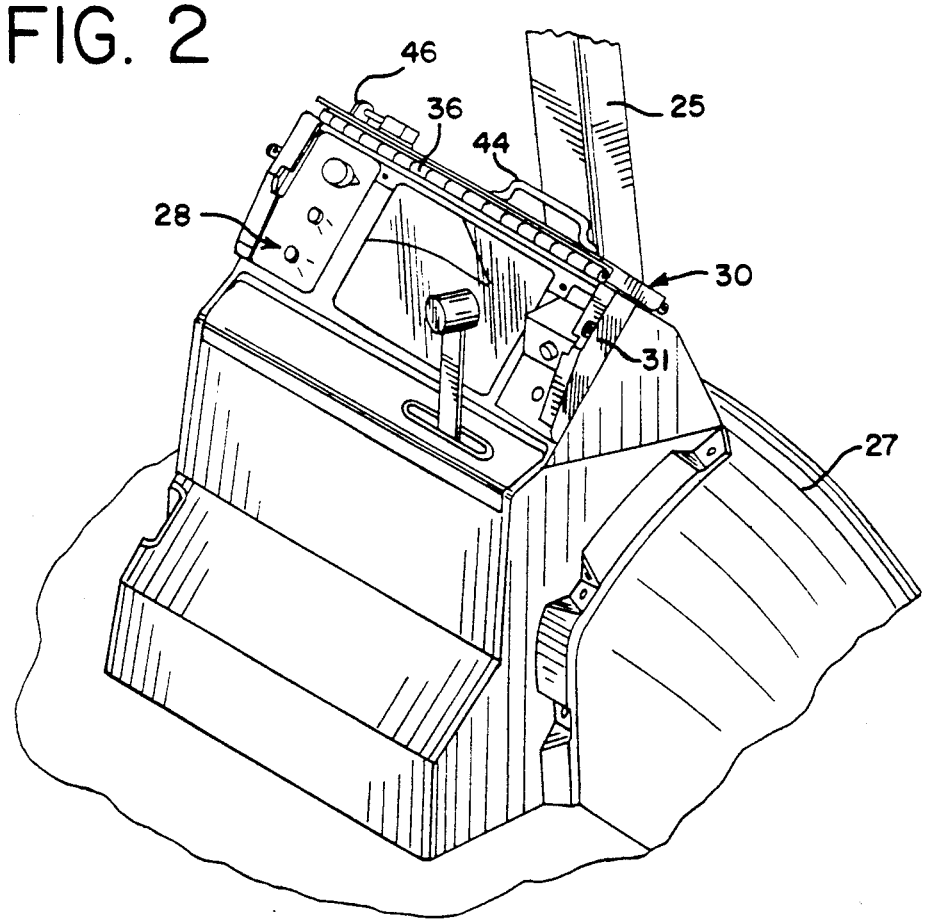
FIG. 2 is a perspective view of the instrument panel being shown with the panel cover in the open position.
Figure 3:
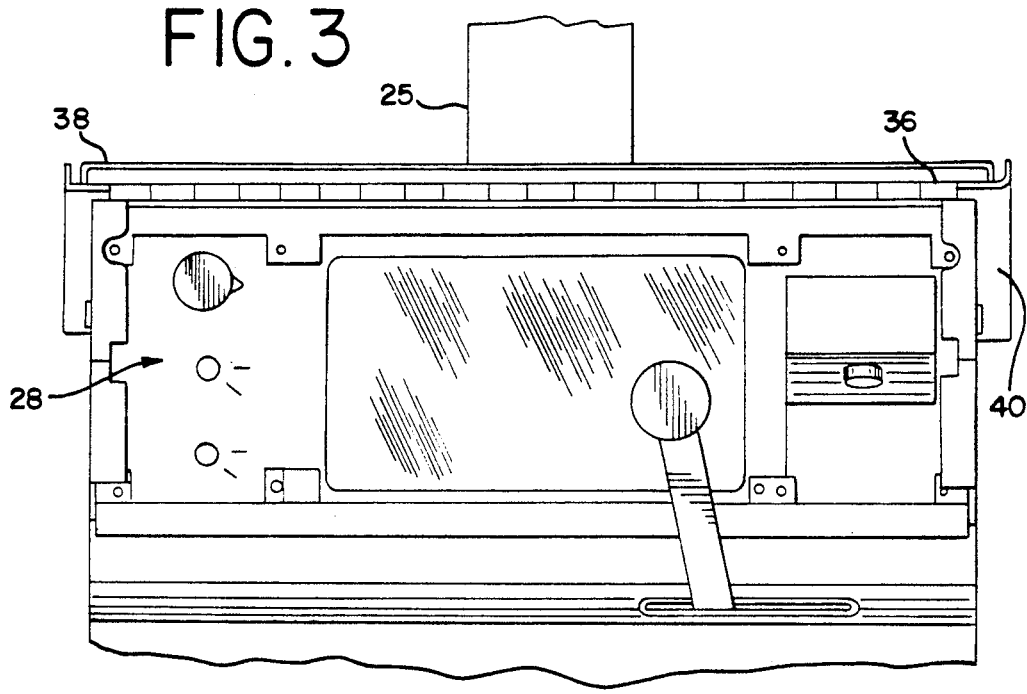
FIG. 3 is a partial front view of the console shown with the cover in the open position.

Referring now to FIG. 2, there is shown the instrument panel 28 with the security cover 30 shown in the open position. The instrument panel contains instrument gauges, ignition controls, switches, etc. that are normally found in a tractor or similar type of driven vehicle. As can be appreciated, it is desirable that the instrument panel not be exposed during the period that the tractor is left unprotected. If the instrument panel is not secured against unauthorized access anyone desiring to vandalize the instrument panel could do so without difficulty. Children playing on the job site who are attracted to a vehicle of this type could cause extensive damage.

In order to cover-up the instrument panel, thus preventing access thereto, there is provided the novel security cover assembly 30 illustrated in FIG. 2.

Figure 5:
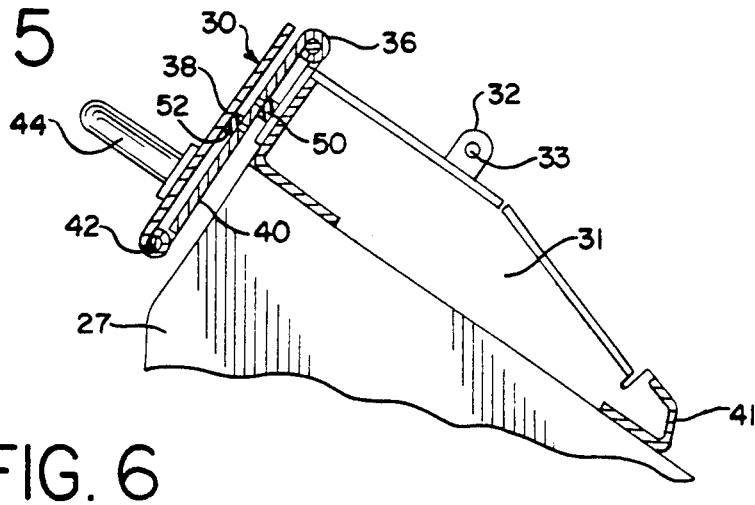
FIG. 5 is a cross-sectional view showing the console cover in the open position and the dampening plugs to minimize movement of the cover sections.
Figure 6:
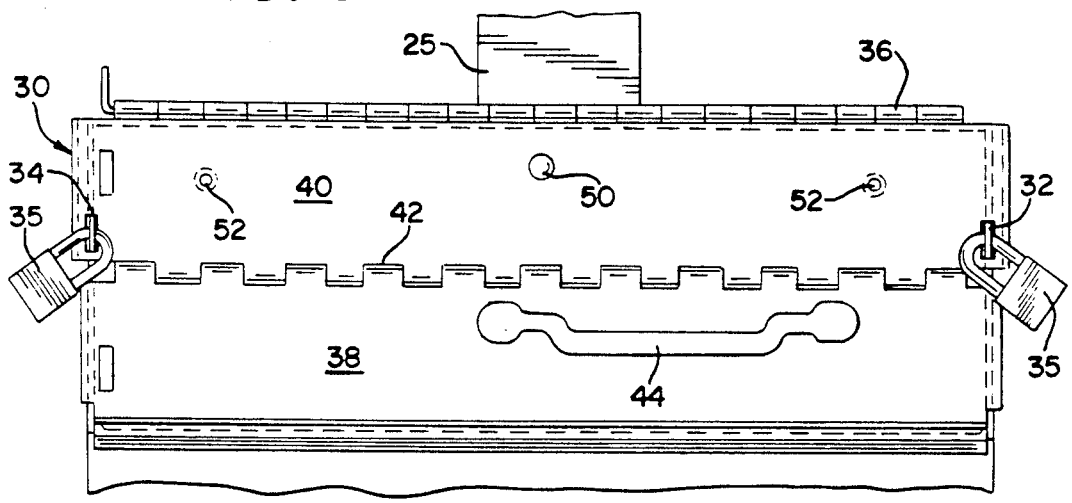
FIG. 6 is a front view showing the cover in the closed and locked position.
Figure 7:
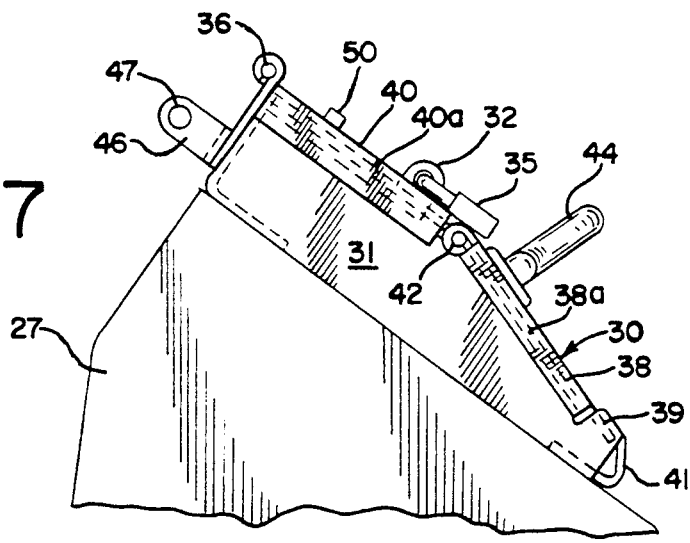
FIG. 7 is a side view showing the cover in the locked position.
Figure 8:
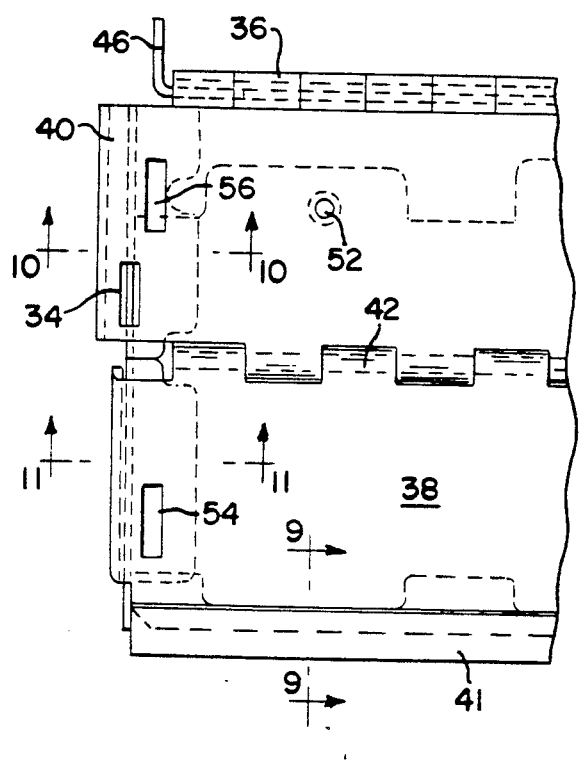
FIG. 8 is a partial plan view with the cover closed, but the hasps and locks removed.

As clearly shown in FIG. 6, the cover consists of a two-part hinged cover that is connected to the console 27 by hinge connection 36. The lower portion 38 is connected to the upper portion 40 through the piano hinge connection 42 which permits folding of the entire cover about the hinge 36 and then folding lower portion 38 on top of upper portion 40 as shown in FIG. 5. Thus, the cover 30 is folded in half so that it will occupy less space and will not obstruct the operators vision when stored. Both the upper and lower portions 38, 40 respectively of the panel contain side flanges 38a and 40a, respectively that extend over side panels 31 secured to the console, to prevent access by a screwdriver, or the like, to pry the cover away from the instrument panel. In order to preclude prying of the cover at its lower edge, lower portion 38 is provided with a lip 39 that fits into a curved bracket 41 secured to the console, thus preventing the introduction of an instrument to pry the lower portion of the cover up and expose the panel.

Figure 4:
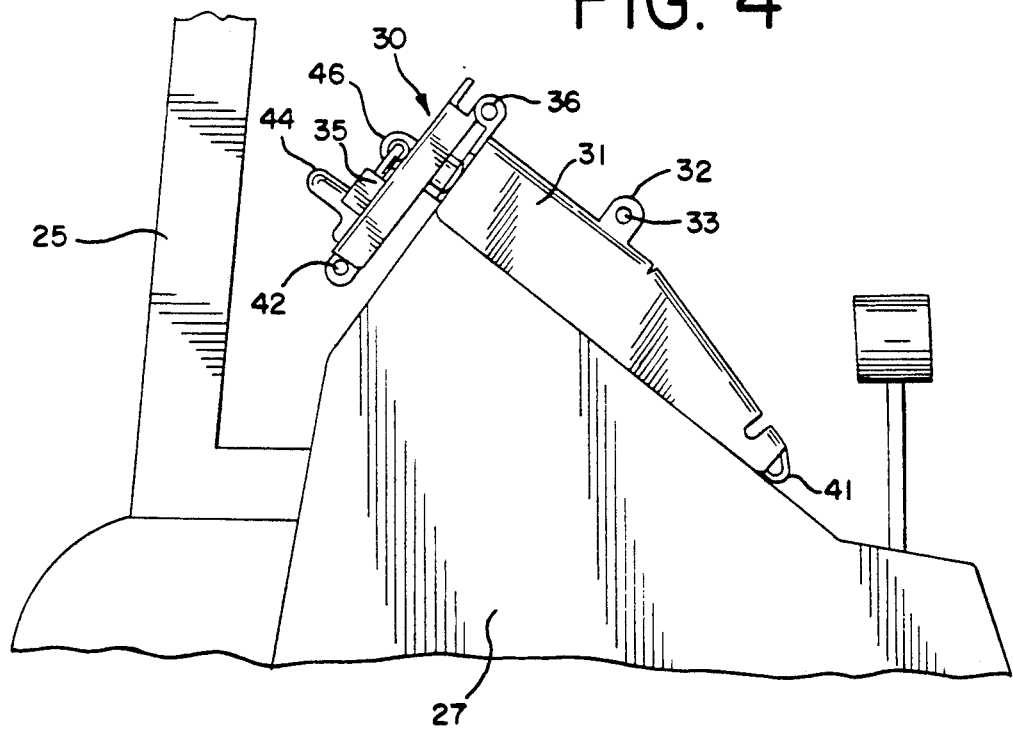
FIG. 4 is a partial side elevation view of the console with the cover shown in the open position.
Figure 12:
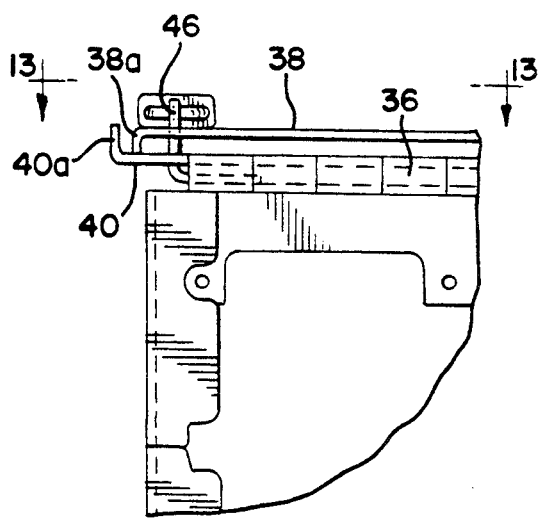
FIG. 12 is a partial view showing the cover in the open position and retained against relative movement between the two sections by the lock.
Figure 13:
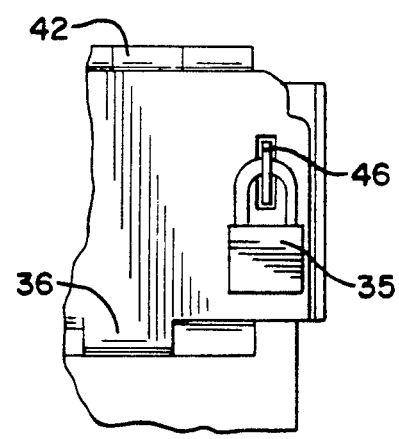
FIG. 13 is a view taken along line 13-13 of FIG. 12.

The side panels 31 have secured to an upper surface thereof locking latches 32 containing apertures 33 that are positioned to extend through apertures 34 in the upper cover section 40 when the cover is in the closed position, as shown in FIG. 6. Locks 35 extend through apertures 33 when the cover is closed to securely retain the cover closed. When the locks 35 are removed the panel cover can be opened by gripping handle 44 and pivoting the two sections 38 and 40 into overlapping relationships about hinge 42 and then the entire cover is rotated about hinge 36 to move the panel cover out of the way of the operator as shown in FIG. 5. Bumpers 50 secured to the top of section 40 and bumpers 52 secured to the underneath surface of cover section 40 are provided to prevent the panels 38 and 40 from vibrating against adjacent surfaces thus, eliminating wear and noise problems. Also if desired magnetic inserts can be placed in the bumpers 50,52 to assist in maintaining the overlapped cover sections together. The upper and lower panels 38 and 40 are provided with aligned slots 54 and 56, respectively, which slots are positioned to overlap each other and fit onto the locking latch 46 containing an aperture 47 secured to the top of the console when the cover is in the open position. When the cover 30 is open as shown in FIG. 4 the latch extends through the openings 54 and 56 and the lock 35 is inserted in aperture 47 to secure the cover in its open position, as shown in FIG. 12. A view clearly showing the instrument panel in the open position with the cover being locked there is also illustrated in FIG. 2.

Figure 9:
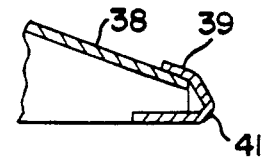
FIG. 9 is a view taken along line 9—9 of FIG. 8 showing the cover in the closed position located under a lip.
Figure 10:
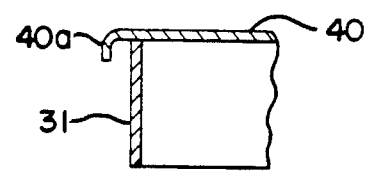
FIG. 10 is a view taken along line 10—10 of FIG. 8 showing the upper portion of the cover extended over the edge of the console to prevent prying.
Figure 11:
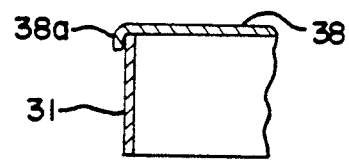
FIG. 11 is a view taken along line 11—11 showing the lower section of the cover extending over the sidewall of the console to prevent prying.

Referring now to FIGS. 9, 10 and 11, there is shown cross sectional views of the structural configurations provided whereby prying of the cover 30 to an open position by a screw driver or the like is substantially prevented. For example, in FIG. 9 there is illustrated that the lower cover section 38 extends under the lip 39 of the bracket 41 secured to the console which thus prevents upward prying of the cover section 38. In FIG. 10 there is shown that the upper section 40 includes a flange 40a that extends downwardly over the side panel 31 to prevent access to the area of contact between the section 40 and side panel 31 and prevent prying of the upper panel away from the side panel. In FIG. 11 there is illustrated that the lower panel section includes a flange portion 38a disposed over the side wall 31 to reduce the opportunity to pry the cover away from the console.

Figure 14:
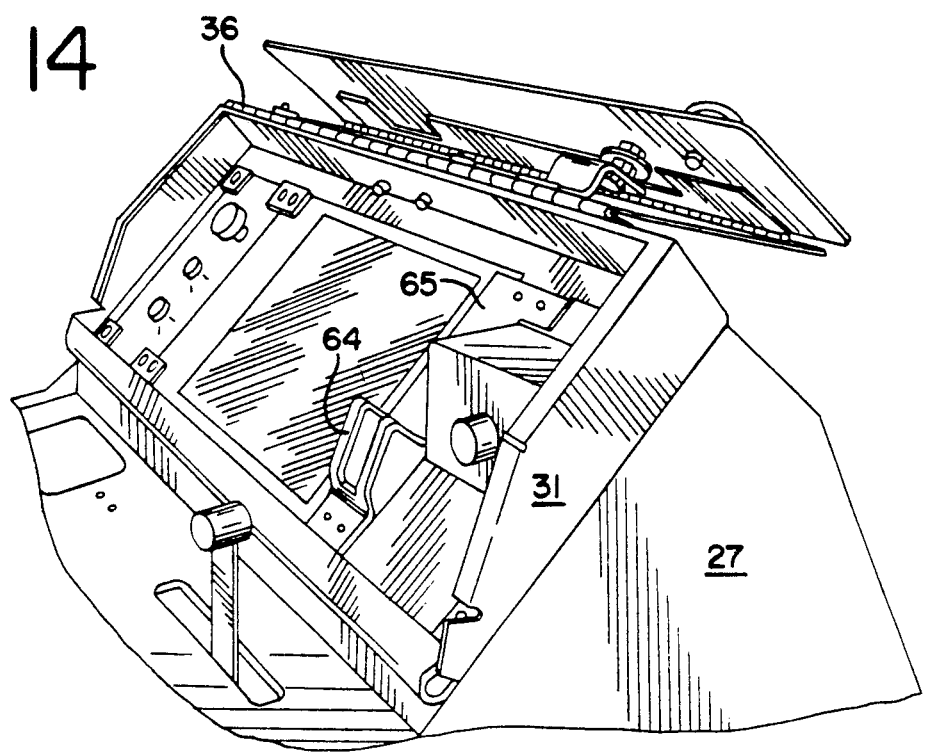
FIG. 14 is a second embodiment of a novel cover design with the cover being shown in the open position.
Figure 15:
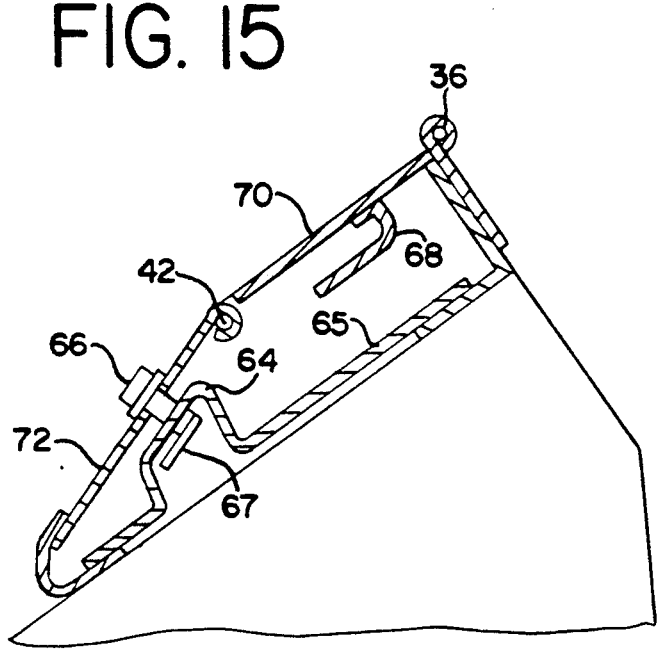
FIG. 15 is a cross-sectional view of the embodiment illustrated in FIG. 14 with the cover in the closed and locked position.

Referring now to FIGS. 14 and 15, there is shown a second embodiment of applicants novel security cover for an instrument panel. Where the parts are identical to those disclosed in the first embodiment the same numbers will be applied. This security cover is generally configured in a fashion similar to the first embodiment in that there are upper and lower sections 70 and 72 that are hinged together by hinge 42 to permit readily overlaying the lower section 72 over the upper section 70. When the cover is closed it lies on top of the side panels 31 secured to the console. The section 70 is hinged to the console 28 by piano hinge construction 36 about which the entire security cover rotates into an out of the way position are shown in FIG. 14. Thus the cover can be readily moved to a storage position which does not obstruct the operators view. Furthermore, if desired, the side plates 31 could be recessed to receive the flat cover to make it more difficult to pry the cover open.

The principal difference between the instrument panel cover shown in FIGS. 14 and 15, from the one illustrated in FIGS. 1-13 is the locking arrangement for retaining the instrument panels in both the open and closed positions.

In the embodiment illustrated in FIGS. 14 and 15 there is provided a locking bracket 64 located in lower portion of the instrument panel that is formed in a plate 65 secured to the console 27. There is also provided a bracket 68 secured to the underside of the upper panel 70 which comes into play when the cover is moved to the open position to secure the overlapped sections together as shown in FIG. 14. The cover is locked relative to the console by a lock mechanism 66 secured to the lower section 72. In the closed position, as shown in FIG. 15, the panel is locked by means of operating the lock 66 to move the pawl 67 underneath a section of locking bracket 64 to prevent opening of the panel. When a key placed in lock 66 to rotate pawl 67 to place the pawl in alignment with the opening in bracket 64 the lower section 70 is free to be moved as shown in FIG. 14, to where lower section 72 is disposed over the section 70 and the cover is rotated about hinge 36 to open the cover. In this position, the lock 66 is operated to move pawl 67 into engagement with locking bracket 68 to retain the locking cover in the position shown in FIG. 14.

It is intended to cover, by the appended claims, all such modifications which fall within the true scope and spirit of the invention.

What is claimed is:

1. A security cover assembly for an instrument panel located on a console, said cover assembly consists of an upper cover section pivotally connected to said console by a horizontally extending hinge, a lower cover section pivotally supported to the upper cover section by a horizontally extending hinge and including a lip portion along its entire lower end, bracket means secured to said console for receiving said entire lip portion to prevent access to said lip portion to pry open the cover, first locking means including a latch secured to said console, which latch extends through an opening defined by said upper cover section and a lock received by said latch for retaining said cover assembly in a locked position for releasably securing said cover assembly to said console to prevent access to said instrument panel, and a second locking assembly for retaining the cover sections together in an open position comprising a locking bracket secured to said console, and each of said cover sections defining aligned openings that are constructed and arranged whereby the cover assembly is hinged and moved to the open position the locking bracket extends through said openings and is positioned to receive the lock to retain the cover in the open position.

2. A security cover assembly as set forth in claim 1 including bumper dampening means comprising magnetic inserts disposed between said cover sections, in the open position, to aid in retaining the cover sections in juxtaposition to minimize vibrations therebetween.

* * * * *